3,151,112
PROCESS FOR THE PREPARATION OF MORPHOLINES

Philip H. Moss, Austin, Tex., assignor to Jefferson Chemical Company, Inc., Houston, Tex., a corporation of Delaware
No Drawing. Filed May 21, 1956, Ser. No. 585,930
10 Claims. (Cl. 260—247)

This invention relates to the preparation of morpholines and, more particularly, to an improved process for reacting ether glycols, such as dialkylene glycol to form both substituted and unsubstituted morpholines.

In its broadest scope, the process of this invention comprises reacting a dialkylene glycol with ammonia in contact with hydrogen and a hydrogenation catalyst, said glycol having the formula:

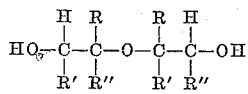

in which R, R' and R'' are selected from the group consisting of hydrogen, alkyl and aryl radicals.

Ordinarily, a temperature between about 150° C. to about 400° C. and a pressure between about 30 to about 400 atmospheres will be employed.

Morpholines have been produced by various methods. For example, it is known to produce morpholine by the intramolecular dehydration of diethanolamine by means of sulfuric acid. This process is inconvenient in that it requires the handling of large quantities of sulfuric acid and caustic and involves the disposal of considerable quantities of by-product sodium sulfate. Morpholine has also been obtained as a by-product of the reaction of diethylene glycol with ammonia to produce 2-(2-hydroxyethoxy) ethylamine as the main product. This latter preparation has the disadvantage that the yields of morpholine are exceedingly low, resulting in an economically unattractive process when morpholine is the desired product. In contrast with the known methods, the process of the instant invention produces morpholines in high yields from readily available and relatively inexpensive glycols.

In accordance with this invention, a dialkylene glycol, described hereinabove, and including such glycols as diethylene glycol, dipropylene glycol, di-1,2-butylene glycol, di-2,3-butylene glycol, is reacted with ammonia in the presence of hydrogen and a hydrogenation catalyst to produce morpholines. The term "morpholines" employed herein, is used in the generic sense and is meant to include the compound from which the name is derived and the carbon substituted alkyl and aryl derivatives thereof. Thus, for example, this term includes morpholine and its mono, di, tri, and tetra alkyl or aryl substituted derivatives. In general, the substituted group will be a lower alkyl radical. It is important to note that only those glycols having the hydroxyl radical attached to a primary or secondary carbon atom are suitable for this reaction.

The process of this invention is generally conducted at an elevated temperature and under pressure. The reaction temperature, therefore, may be between about 150° C. to about 400° C., although it has been found preferable to operate in the relatively narrow temperature range between 200° C. to 300° C. Desirably, the process is conducted under relatively high pressures ranging from about 30 to about 400 atmospheres. As a general rule, however, operation of the process between 65 to 225 atmospheres is preferred.

The presence of hydrogen is critical for the proper and efficient conduct of the instant process. While it is not necessary for hydrogen to constitute the entire atmosphere within the reaction vessel, it is necessary that the hydrogen partial pressure amount to a substantial part of the reaction atmosphere. Thus, the hydrogen should contribute at least 10 and preferably between 20 to 200 atmospheres of pressure to the total pressure in the system. Generally, the reaction vessel is swept clean with hydrogen gas and thereafter a predetermined amount of hydrogen is pumped into the sealed vessel. When the vessel is heated to bring it up to reaction temperatures, the hydrogen and reactants contained therein will bring the total pressure into the operating range indicated above.

The effect of hydrogen partial pressure on the process is best illustrated by the data shown in Table I, which was obtained from reacting diethylene glycol and ammonia at different hydrogen partial pressures:

TABLE I

| Total Pressure, p.s.i.g. | Hydrogen Partial Pressure, p.s.i.g. | Diethylene Glycol Reacted, percent | Conversion to Morpholine, percent |
|---|---|---|---|
| 1,200 | 0 | 63 | 6.3 |
| 1,500 | 300 | 98 | 55.6 |
| 3,000 | 1,800 | 74 | 31.2 |
| 6,000 | 4,800 | 57 | 18.3 |

A large number of hydrogenation catalysts may be employed in this process. Such catalysts, also known as hydrogenation-dehydrogenation catalysts, include one or more of the metals from the group including copper, nickel, cobalt, chromium, molybdenum, manganese, platinum, palladium and rhodium and the oxides of these metals. The metals or their oxides may be employed in combination with the normally nonreducible oxides such as chromium oxide $Cr_2O_3$, molybdenum oxide $Mo_2O_3$ and manganese oxide MnO. The amount of the nonreducible oxide employed may be varied considerably but preferably should be present in minor amounts. The preferred catalysts, that is those most effective for the reaction, are the metals or oxides of copper, nickel, cobalt and chromium. A particularly satisfactory catalyst is one in which the active components consist essentially of 75 mole percent nickel, 22 mole percent copper and 1.6 mole percent chromium. This catalyst is readily prepared by ignition of a mixture of the corresponding nitrate salts followed by a reducing treatment, although other well known means of preparation may be employed.

The catalyst may be carried on an inert support, such as silica, Filtros and alumina, and is suitable, either with or without a support, for use in a batch process or in a fixed-bed continuous flow system. In a batch process, the amount of catalyst generally employed is between about 5% to 20% of the weight of the glycol.

In the event that the catalyst is in the metal oxide form, it may be directly introduced in the reaction zone or prereduced and subsequently introduced in the reaction zone. Both methods are generally suitable since the reaction is conducted under reducing conditions.

The aforementioned catalysts may be modified to obtain better results. Thus, suitable modifiers or catalyst stabilizers, such as sodium and potassium sulfate, may be deposited on the catalyst. These are generally effective for prolonging the catalyst life.

The ratio of reactants, that is the ratio of ammonia to glycol, has a surprising effect on the efficiency of this process. While the process may be conducted by reacting equal molar amounts of ammonia and glycol, it has been observed that if there is a molar excess of ammonia the yields of the desired product are sharply increased. Optimum yields will be obtained when the molar ratio of ammonia to glycol is about 3:1. Molar ratios may be employed in the range from 1:1 to about 10:1. It is not necessary that the reagents for this reaction be in an anhydrous condition. The following table relating to the reaction of diethylene glycol with ammonia illustrates how conversion to morpholine is affected by changes in the proportion of reactants.

TABLE II

| Molar Ratio of Ammonia to Diglycol | Conversion of Diethylene Glycol to Morpholine, percent |
| --- | --- |
| 1.5:1 | 20.2 |
| 3.0:1 | 30.7 |
| 4.5:1 | 29.5 |

As will be indicated in the following examples, the process may be conducted batchwise or in a continuous process. Continuous processes may be more economical, however, due to the greater throughput and ease of operation. It should be appreciated that intermediate reaction products in addition to unreacted glycol can be recycled to substantially increase the total yield.

*Example I*

PREPARATION OF DIMETHYL MORPHOLINE 269 grams of dipropylene glycol and 32 grams of ammonia were put in an autoclave together with 30 grams of a copper oxide-nickel oxide-chromic oxide catalyst modified with sodium sulfate and diluted with an equal weight of finely divided Filtros support. The vessel was pressured to 925 p.s.i.g. wth hydrogen and heated at 256 to 265° C. for five hours. The reaction pressure under these conditions ranged from 1720 to 2425 p.s.i.g. After this period of time, hydrogen was released and the product filtered, washed, and separated from the catalyst. 72.5% of the dipropylene glycol reacted and of this amount 84.8% was converted to the desired dimethylmorpholine. The product had a boiling range of 143°–146° C. and $n_D^{20}$ 1.4440.

In a parallel experiment carried out in essentially the same manner except that hydrogen was omitted, the conversion of dipropylene glycol to dimethylmorpholine amounted to only 1.8%.

*Example II*

PREPARATION OF MORPHOLINE 122 grams of diethylene glycol and 25 grams of a nickel-copper-chromic oxide catalyst previously reduced, were charged to a stainless steel autoclave vessel of 1 liter capacity. After purging with hydrogen, 58 grams of anhydrous ammonia were weighed into the vessel. Hydrogen was then added until the total pressure was 500 p.s.i.g. The vessel was placed in a rocking mechanism and heated at 250° C. while agitating for two hours. On completion of this reaction period and separation of the product, a yield of 49% morpholine based on reacted glycol was obtained.

*Example III*

CONTINUOUS PREPARATION OF DIMETHYYLMORPHOLINE

The reactor employed for the continuous operation of dimethylmorpholine consisted of a tubular pressure vessel measuring 2 inches inside diameter by 24 inches long. A basket containing the nickel-copper-chromic oxide catalyst was inserted in this zone. A premixed solution of dipropylene glycol and ammonia contained in a storage vessel under 350 p.s.i.g. hydrogen pressure was pumped through a preheater into the bottom of the reactor. Hydrogen under pressure was metered through a rotameter and led through a line into the bottom of the reactor where it mixed with the reactants. The combined feed then flowed upward through the externally heated reactor. The product, on leaving the reactor, passed through a heat exchanger where it was cooled to about 30° C. and directed into a liquid gas separator under 3000 p.s.i.g. Excess hydrogen was released through a back-pressure regulator. Liquid product was continuously discharged to the atmosphere from this separator.

The following conditions were employed in a typical run:

Space velocity, liquid reactants, gm./ml. catalyst/hr. _____ 0.23
Ratio hydrogen to liquid reactants, s.c.f. $H_2$/1000 gms. _____ 11.52
Temp., catalyst bed, ° C. _____ 275
Pressure, p.s.i.g. _____ 3000
Moles ammonia/mole dipropylene glycol _____ 1.36

The product obtained from a steady four-hour run analyzed as follows:

Dipropylene glycol reacted, percent _____ 58.4
Yield, dimethylmorpholine, percent _____ 91.1

The dimethylmorpholine product may be separated from the unreacted glycol and intermediate reaction products by distillation and the latter compositions recycled in the process.

*Example IV*

CONTINUOUS PREPARATION OF MORPHOLINE

The reactor described in Example III was employed except that the catalyst chamber was charged with a catalyst in which the active components consisted of copper, nickel, and manganese oxide (5.5% Cu, 17.0% Ni, 0.6% Mn) compressed into pellets. The following reaction conditions were used.

Space velocity, liquid reactants, gm./ml. catalyst/hr. _____ 1.26
Ratio hydrogen to liquid reactants, s.c.f. $H_2$/1000 gms. _____ 5.0–5.4
Temp., ° C. _____ 280
Pressure, p.s.i.g. _____ 3000
Moles ammonia/mole diethylene glycol _____ 2.96

A sample taken after a continuous run of 22 hours duration was freed of excess ammonia and distilled. It was found that 71.6% of the diethylene glycol had been converted. The morpholine fraction had B.R. 120–130° C. and on redistillation yielded morpholine, B.P. 127° C., found by analysis to be 97.8% pure. The yield based upon diethylene glycol consumed was 34.5%. In addition, 2-(2-aminoethoxy) ethanol was obtained in 29% yield.

*Example V*

31.6 lbs. of diethylene glycol and 18.4 lbs. of 83.5% aqueous ammonia were continuously pumped into a reaction chamber at a rate of 2370 grams per hour. Hydrogen was introduced continuously at a rate of 9.9 standard cubic feet per hour. The reaction chamber contained 1200 ml. of pelleted catalyst. The catalyst consisted of 75.7 atom percent nickel, 22.7 atom percent copper, and 1.6 atom percent chromium. The reaction chamber was maintained at a pressure of 3000 lbs. per square inch and at a temperature of 260° C. The collected product was distilled and separated showing a 47.0% conversion of diethylene glycol to morpholine, a 19.6% conversion to amines boiling higher than morpholine but lower than diethylene glycol, 12.7% conversion to amines boiling higher than diethylene glycol and 17.9% recovery of diethylene glycol. The amines boiling between morpholine and diethylene glycol are intermediates and may be recycled to produce additional morpholine.

Since this invention is subject to many variations, the foregoing description and examples are intended for the purpose of illustration only and no limitation, not expressly stated in the appended claims, should be deduced therefrom.

I claim:
1. A process for producing a morpholine compound which comprises reacting a glycol with ammonia in the presence of hydrogen and a hydrogenation catalyst at a temperature in the range of 150° to 400° C. and at a superatmospheric pressure between about 30 and 400 atmospheres including a substantial partial pressure of hydrogen of at least 10 atmospheres, said catalyst being selected from the group consisting of copper, nickel, chromium, cobalt, manganese, molybdenum, palladium, platinum, rhodium, oxides of said metals, and mixtures thereof, and said glycol having the formula

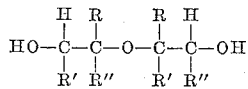

in which R, R' and R'' are selected from the group consisting of hydrogen and lower alkyl radicals, and isolating a morpholine compound corresponding to said glycol from the reaction products.

2. A process according to claim 1 wherein the glycol is dipropylene glycol, and the dimethylmorpholine corresponding to said dipropylene glycol is isolated from the reaction products.

3. A process for manufacturing morpholine which comprises reacting diethylene glycol with ammonia and a substantial pressure of hydrogen of at least 10 atmospheres at a substantial superatmospheric pressure between 30 and 400 atmospheres and at a temperature of 150° to 400° C. in the presence of a hydrogenation catalyst selected from the group consisting of copper, nickel, chromium, cobalt, manganese, molybdenum, palladium, platinum, rhodium, oxides of said metals, and mixtures thereof, and isolating morpholine from the reaction products.

4. A process for producing morpholine which comprises reacting diethylene glycol and ammonia with hydrogen and a hydrogenation catalyst at a temperature of about 150–400° C. and a superatmospheric pressure between about 30 and 400 atmospheres including a substantial partial pressure of hydrogen of at least 10 atmospheres, the molar ratio of said ammonia to said glycol being at least about 1.5:1, said catalyst consisting essentially of about 75 mole percent nickel, 22 mole percent copper and 1.6 mole percent chromium.

5. A process for producing morpholine which comprises reacting diethylene glycol with ammonia in the presence of hydrogen and a nickel-copper-chromium oxide catalyst at a superatmospheric pressure between about 30 and 400 atmospheres including a partial pressure of hydrogen of at least 10 atmospheres and at a temperature of 150 to 400° C. and recovering morpholine from the reaction products.

6. A process for producing dimethyl morpholine which comprises reacting dipropylene glycol with ammonia in the presence of hydrogen and a nickel-copper-chromium oxide catalyst at a superatmospheric pressure between about 30 and 400 atmospheres including a substantial partial pressure of hydrogen of at least 10 atmospheres and a temperature of 150° to 400° C., and isolating dimethylmorpholine from the reaction products.

7. A process for producing a morpholine compound which comprises reacting a glycol with ammonia in the presence of hydrogen and a nickel, copper, chromium oxide catalyst at a temperature within the range of about 150° to 400° C. and a superatmospheric pressure between about 30 and 400 atmospheres including a substantial partial pressure of hydrogen of at least 10 atmospheres and isolating a morpholine compound corresponding to the glycol from the reaction products, said glycol having the formula:

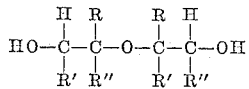

in which R, R' and R'' are selected from the group consisting of hydrogen and lower alkyl radicals.

8. A process for producing a morpholine compound which comprises reacting a glycol with ammonia in the presence of hydrogen and a nickel, copper, chromium oxide catalyst at a temperature within the range of about 200° to 300° C. and a superatmospheric pressure between about 65 and 225 atmospheres including a substantial partial pressure of hydrogen of at least 10 atmospheres and isolating a morpholine compound corresponding to the glycol from the reaction products, said glycol having the formula:

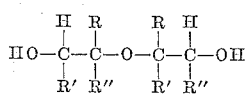

in which R, R' and R'' are selected from the group consisting of hydrogen and lower alkyl radicals, the nickel, copper and chromium of said catalyst being present in the mole percent ratio to each other of about 75 mole percent nickel, 22 mole percent copper and 1.6 mole percent chromium, the molar ratio of said ammonia to said glycol being at least about 1.5:1.

9. A process according to claim 8 wherein the glycol is dipropylene glycol and the morpholine compound is dimethyl morpholine.

10. A process for preparing dimethylmorpholine which comprises heating at an elevated temperature above 150° C. one mol of bis(2-hydroxypropyl) ether with at least about two mols of ammonia in the presence of a hydrogenation catalyst of the group consisting of nickel and cobalt at a superatmospheric pressure in an atmosphere wherein hydrogen is present in substantial amounts.

References Cited in the file of this patent
UNITED STATES PATENTS

| | | |
|---|---|---|
| 2,001,584 | Reed | May 14, 1935 |
| 2,194,906 | Krzikalla | Mar. 26, 1940 |
| 2,412,209 | Dickey et al. | Dec. 10, 1946 |
| 2,421,650 | Reppe | June 3, 1947 |
| 2,519,560 | Fowler | Aug. 22, 1950 |
| 2,636,032 | Weston et al. | Apr. 21, 1953 |
| 2,748,143 | Erickson | May 29, 1956 |
| 2,754,330 | Schreyer | July 10, 1956 |

FOREIGN PATENTS

| | | |
|---|---|---|
| 791,744 | Great Britain | Mar. 12, 1958 |

OTHER REFERENCES
Hill et al.: Jour. A.C.S., vol 60, pages 1033–35 (1938)